(12) United States Patent
Arai et al.

(10) Patent No.: US 11,634,577 B2
(45) Date of Patent: Apr. 25, 2023

(54) RESIN POWDER MATERIAL, LASER POWDER MOLDING METHOD AND DEVICE

(71) Applicant: HITACHI, LTD., Tokyo (JP)

(72) Inventors: Satoshi Arai, Tokyo (JP); Shigeharu Tsunoda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 104 days.

(21) Appl. No.: 15/312,991

(22) PCT Filed: Jan. 28, 2015

(86) PCT No.: PCT/JP2015/052254
§ 371 (c)(1),
(2) Date: Nov. 21, 2016

(87) PCT Pub. No.: WO2016/121013
PCT Pub. Date: Aug. 4, 2016

(65) Prior Publication Data
US 2017/0190905 A1    Jul. 6, 2017

(51) Int. Cl.
| | | |
|---|---|---|
| *C08G 63/183* | (2006.01) |
| *C08K 3/016* | (2018.01) |
| *C08K 3/36* | (2006.01) |
| *C08K 5/00* | (2006.01) |
| *C08K 7/14* | (2006.01) |
| *B29C 64/153* | (2017.01) |
| *B33Y 10/00* | (2015.01) |
| *B33Y 30/00* | (2015.01) |
| *B33Y 50/02* | (2015.01) |
| *B33Y 70/00* | (2020.01) |
| *C08L 67/02* | (2006.01) |
| *B29C 64/40* | (2017.01) |
| *B29K 67/00* | (2006.01) |
| *B29K 105/00* | (2006.01) |

(52) U.S. Cl.
CPC ............ *C08L 67/02* (2013.01); *B29C 64/153* (2017.08); *B29C 64/40* (2017.08); *B33Y 10/00* (2014.12); *B33Y 30/00* (2014.12); *B33Y 50/02* (2014.12); *B33Y 70/00* (2014.12); *C08G 63/183* (2013.01); *C08K 3/016* (2018.01); *C08K 3/36* (2013.01); *C08K 5/0066* (2013.01); *C08K 7/14* (2013.01); *B29K 2067/006* (2013.01); *B29K 2105/251* (2013.01); *C08L 2201/02* (2013.01)

(58) Field of Classification Search
CPC ...... C08L 67/02; C08L 69/00; C08L 2201/02; B29C 64/153; B29C 64/40; B29C 64/393; B29K 2067/006; B29K 2105/251; B33Y 10/00; B33Y 30/00; B33Y 50/02; B33Y 70/00; C08G 63/183; C08K 3/016; C08K 3/36; C08K 5/0066; C08K 7/14; B29B 2009/125

See application file for complete search history.

(56) References Cited

U.S. PATENT DOCUMENTS

| | | | | |
|---|---|---|---|---|
| 5,527,877 A | * | 6/1996 | Dickens, Jr. .......... | B29C 41/003 156/62.2 |
| 2005/0003189 A1 | * | 1/2005 | Bredt .................... | C08L 101/00 428/402 |
| 2009/0295042 A1 | | 12/2009 | Pfister et al. | |
| 2010/0160547 A1 | | 6/2010 | Martinoni | |
| 2017/0190905 A1 | * | 7/2017 | Arai ...................... | B33Y 30/00 |

FOREIGN PATENT DOCUMENTS

| | | | |
|---|---|---|---|
| CN | 102344554 | * | 2/2012 |
| JP | 10-505116 A | | 5/1998 |
| JP | 2010-006057 A | | 1/2010 |
| JP | 2011-68125 A | | 4/2011 |
| JP | 2012-513319 A | | 6/2012 |

OTHER PUBLICATIONS

Fumed Silica—Wikipedia (Year: 2018) retrived Feb. 19, 2019.*
Polybutylene terephthalate, Wikipedia (Year: 2019).*
Chang et al Copolyesters. VII. Thermal Transitions of Poly (butylene terephthalate-co-isophthalate-co-adipates), Journal of Applied Polymer Science, vol. 51, 999-1004 (1994) (Year: 1994).*
Wu et al "Crystallization of Poly(ethylene terephthalate-co-isophthalate)", Journal of Polymer Science: Part B: Polymer Physics, vol. 38, 2515-2524 (2000) (Year: 200).*
Finelli et al "Crystallization kinetics and melting behavior of Poly(butylene-terephthalate) random copolymers", E.Polymer Journal 37(2002),2039-2046 (Year: 2001).*
BASF Ultradur B 2550 PBT (retrieved Feb. 13, 2019).*

(Continued)

*Primary Examiner* — Ling Siu Choi
*Assistant Examiner* — Gennadiy Mesh
(74) *Attorney, Agent, or Firm* — Miles & Stockbridge, P.C.

(57) ABSTRACT

A resin powder material comprising copolymerized polybutylene terephthalate resin powder and an inorganic substance, for example, fumed silica, having an average primary particle diameter of 100 nm or less in an amount up to 1.0 wt %. The polybutylene terephthalate resin comprises from 5 mol % to 15 mol % of Isophthalic acid and has powder with average particles diameter of 79 μm and a maximum particles diameter of 106 μm. Powder is obtained by grinding pellets of the copolymerized polybutylene terephthalate resin having a viscosity of 0.85 to 1.0 dl/g. Powder composition used for production of molded articles by powder laminate molding process.

8 Claims, 5 Drawing Sheets

(56) References Cited

OTHER PUBLICATIONS

Leonard C. Thomas "Use of multiple heating rate DSC and modulated temperature DSC to detect and analyze temperature-time-dependent transitions in materials", Reprinted from American Laboratory Jan. 2001 (Year: 2001).*

Haseung Chung et al "Processing and properties of glass bead particulate-filled functionally graded Nylon-11 composites produced by selective laser sintering", 2006 (Year: 2006).*

Pieter-Jan De Temmerman et al "Quantitative characterization of agglomerates and aggregates of pyrogenic and precipitated amorphous silica nanomaterials by transmission electron microscopy", Journal of Nanobiotechnology 2012, 10:24 (Year: 2012).*

Scientific Polymer Products Inc., Safety Data Sheet—Poly(butylene terephthalate), Jan. 28, 2015, pp. 1-6.

* cited by examiner

AFTER LAMINATE MOLDING

DETACH SUPPORT

RESIN POWDER MATERIAL, LASER POWDER MOLDING METHOD AND DEVICE

TECHNICAL FIELD

The present invention relates to a three-dimensional laminate molding technique for a resin powder.

BACKGROUND ART

A three-dimensional laminate molding is a method using no mold, and thus has a merit that a trial manufacture can be made for a short period of time and has been frequently employed for a trial manufacture for confirming a function in recent years. Additionally, in addition to an application to a trial manufacture, needs to apply to a direct production of many kinds of products by small lot production are increased. Under such a background, a powder laminate molding method gets a lot of attention recently.

For example, JP 2011-68125, A (Patent Literature 1) discloses "Composite material powder containing spherical carbon and resin powder as indispensable components is used and is molded by the powder sintering laminating molding method and then is impregnated with a heat-resistant resin to obtain the molding." (cf. Abstract).

CITATION LIST

Patent Literature

Patent Literature 1: JP 2011-68125, A

SUMMARY OF INVENTION

Technical Problem

Reasons as to why a powder laminate molding method attracts attention include that it is a method which can use a resin which can be used even in an injection molding, and thus strength, reliability, and dimensional stability of a molded body are higher than those of other molding methods.

A powder laminate molding method is a method in which: a powder material is sequentially arranged by a roller or blade within a molding place, the powder material is selectively heated and sintered by a laser etc., and a laminated product is made by repeating those. In order to suppress a warpage at the time of molding, it is said that this method requires to set a surface temperature of a resin powder just before sintering (referred to also as powder resin) and a molded body between a melting point of the resin and a crystallization temperature thereof by a heating means set at a molding place etc. at the time of molding.

However, actually, rather than between a melting point and a crystallization temperature, if it is not set to a vicinity of a melting point, particularly a temperature about from 5 to 15° C. lower than a melting point of a resin in polyamide 12 (hereinafter, referred to as PA12) etc. having a melting point of about 185° C., and if a heating state is not maintained at the temperature range, then in many cases a warpage is generated and particularly the effect becomes remarkable in case of molding a large product.

This is because lowering a temperature begins a crystallization and a warpage due to a shrinkage of a resin takes place.

As for a device, in many cases a use of PA12 or PA11 is borne in mind, and thus an upper limit of a molding temperature area of a device is frequently set to about 200° C. In that event, a resin having a melting point more than about 200° C. cannot be molded. In order to be necessary to retain a temperature, a sensor for monitoring an ambient temperature and mechanisms etc. are also designed so as to have a heat-resistance of about 200° C.

As for a resin having a melting point of 200° C. or less such as PA12, a continuous working temperature of a laminate molded body (referred to also as a lamination molded product or simply referred to as a molded product) or a lamination molded body produced by a lamination molding (referred to also as a lamination molded article or simply referred to as a molded article) is 120° C. or less. For example, in consideration for the case of applying a lamination molded body as a trial manufacture to a partial product in a field representing an automobile and a railroad, it is necessary to have a high strength and to be able to use a molded body in hot environment.

Therefore, it is desired to produce a lamination molded body having a heat-resistance as high as possible.

Additionally, it is desired to use a material which can conduct a lamination molding at a simple process.

In the forementioned partial product in a field representing an automobile and a railroad, it is exposed in a high temperature and high humidity environment, and thus it starts to be required to have a low water absorption rate in a resin material prior to molding or a lamination molded body.

As a technique which can conduct molding by a general-purpose laser sintering machine and enhances a heat-resistance, Patent Literature 1 discloses a laminate molded body prepared by employing a composite material powder comprising a spherical carbon and a resin powder of polyamide 12 as essential components.

This method discloses a technique of enhancing strength and heat-resistance in which a molded article is dipped in an impregnating agent. However, the molded article inside thereof is PA12, and thus it is not considered that a deterioration of PA12 takes place when a heat is transferred beyond the impregnating agent.

Additionally, as for both the impregnating agent and PA12, it is not considered that a molded article is employed in an environment exposed to an outside air. Thus, also a water absorbability is not considered.

Therefore, before and after the lamination molding, it takes a lot of trouble over being retained in a dry environment, and thus a production method was complicated. Furthermore, also a device configuration was complicated.

Additionally, a laminate molded body causes lowering an elasticity due to a water absorption of molded body of PA12 resin in a high humidity environment. In result, also strength is lowered. Therefore, there was a problem to be able to apply to only a partial product employed in low humidity environments.

Thus, the purpose of the present invention is to provide a lamination molded body which is difficult to absorb water and which has a high heat resistance.

Specifically, it is to provide a resin powder composite material for a lamination molding comprising polybutylene terephthalate (hereinafter referred to as PBT) as a main component.

Solution to Problem

In order to solve the above problem, for example the configuration of the attached claims is adopted.

The present invention includes plural means for solving the above problem, and adopts the following configuration as one example.

One example of the present invention is:

a resin powder material used for a powder laminate molding method, wherein said resin powder is a polybutylene terephthalate resin having a crystallization temperature lower than that of a homopolybutylene terephthalate resin.

One example of the present invention is:

a laser powder molding method comprising:

the step of arranging a resin powder material; and the laser irradiating step of irradiating a laser on said arranged resin powder material to sinter or melt a place which said laser is irradiated on;

wherein said arranging step and said laser irradiating step are sequentially repeated to prepare a laminate molded body, and wherein said resin powder material is a polybutylene terephthalate resin powder having a crystallization temperature lower than that of a homopolybutylene terephthalate resin.

One example of the present invention is:

a laser powder molding device having a roller or blade and a laser light source comprising:

the step of arranging a resin powder material by using said roller or blade; and the laser irradiating step of irradiating a laser on said arranged resin powder material from said laser light source to sinter or melt a place irradiated;

wherein said arranging step and said laser irradiating step are sequentially repeated to prepare a laminate molded body, and wherein said resin powder material is a polybutylene terephthalate resin powder having a crystallization temperature lower than that of a homopolybutylene terephthalate resin.

Advantageous Effects of Invention

By adopting the present invention, a lamination molded body which is difficult to absorb water and which has a high heat resistance can be provided.

DESCRIPTION OF EMBODIMENT

The working embodiments of the present invention are explained as follows by employing FIG. 1.

The laser powder laminate molding device 50 employed in the present invention is equipped with a roller 1 or a blade 1 for supplying a powder resin 20 for supply to a molding area. It is almost uniformly set so as to be a plain face. It is constituted of a laser light source 2 employed for sintering or melting to laminate/bond the resin powder 21 set, a galvanometer mirror 3 for moving a laser light 4 within a molding area 8, a molding container 5 within the molding area 8, a reflecting plate 7, a storage container 6 for storing a powder material arranged at both sides of said molding container 5, pistons 10 and 11 for operating the molding container 5 and the storage container 6 to an up-and-down direction, and a heater (not shown at figure) for retaining the molding area 8, the molding container 5, and the storage container 6 at a high temperature. In the meantime, the arrangement and structure of the heater can be suitably changed.

An area temperature 9 of the container 6 for storing the powder material 20 (powder resin) is preferably a temperature within the molding area 8 or less. Reason therefor is because it becomes difficult to smoothly set the powder material 20 within said molding container 5 when the temperature of the area temperature 9 is too high.

Lamination molding is conducted by arranging powders by the roller 1 or blade 1, and irradiating a laser light 4 on the resin powder 22 set to sinter or melt it.

This molding step may require a period of time of about maximum 10 minutes at the time of producing a large molded body or plural molded bodies, although it depends on a size of a molded body or a scan speed of the laser light 4.

It is a method of three-dimensionally preparing a resin molded body 40 by repeatedly conducting the molding step of setting the powder resin 22 and irradiating the laser light 4.

A lamination thickness prepared by arranging the powder by the roller 1 or blade 1 is preferably at least 150 µm or less operated because a thermal decomposition takes place when it is too thick.

After a completion of the molding steps repeatedly conducted, the resin molded body 40 becomes at a state being buried in the resin powders 22, it is picked up out of the resin powders 22, and then powders are released from the molded body 40 by a blast etc.

In the meantime, it is desired that the molding area 8 is at a state of filling nitrogen or argon etc. for suppressing a deterioration of powders to lower an oxygen concentration.

The laser light source 2 is necessary to be changed depending on absorption characteristics of the resin powder, but in case a resin powder of a natural color is employed, a $CO_2$ laser (wavelength 10.6 µm) is generally used.

In case it comprises a material absorbing an infrared light such as a resin powder of a black color, not only a $CO_2$ laser but also a fiber laser, YAG laser, and a semiconductor laser (wavelength 800-1100 nm) is preferably employed.

A strength distribution of the laser light 4 is usually Gaussian, but a top hat shape can conduct a laser irradiation at high-definition. In this case, a molded body having a high-precision can be produced.

In the meantime, from the viewpoint of a precision, a spot size of the laser light 4 is preferably made smaller, but a molding a period of time is accordingly lengthened, and thus it desired to usually use 100-600 µm.

In order to conduct a lamination molding, a control information of a laser powder laminate molding device 50 is beforehand created from a 3D model of a molded body or a 3DCAD model thereof, the laser light 4 etc. is operated based on the control information created. Specifically, work procedures to be conducted at respective steps of irradiation conditions etc. of the laser irradiation of the respective layers (laser power, rate, laser pitch, irradiation direction, irradiation number of times etc.) are set based on the 3DCAD model.

This setting can be conducted by a calculating machine connected through a network etc. separately or a calculating machine employed for the design (not shown at figure) and can be any embodiments. It can be also set within the laser powder laminate molding device 50. The information on the 3D model etc. or the work procedure set is preserved at a memory unit of the laser powder laminate molding device 50, and the lamination molding is conducted by employing the preserved information.

In order to preserve or input the information etc. on the above work procedure at the memory unit, the information on the above work procedure can be input by using a means employing a communication such as a network from other calculating machines or a memory device such as an optical disc such as CD-ROM, MO, and a flash memory separately.

EXAMPLES (Re: Resin Powder Material)

In case of conducting a powder laminate molding, in order to secure a high molding quality (particularly density) and suppress a warpage during a molding, a molding temperature area 8 within a chamber for arranging the powder or molded body comes to be from 5 to 15° C. lower than a melting point of the resin powder 20.

In powder laminate devices in the marketplace, in many cases, the upper limit temperature of temperature areas 8 and 9 for arranging the resin powder or molded body is near 200° C. from the viewpoint of a heat-resistance of a device (particularly, sensors for temperature measurements etc.).

Thus, when PBT resin having a melting point of about 225° C. based on homo PBT used for an injection molding etc. was tried to be used, a molding has not been able to be achieved from the viewpoint of a retention temperature of the molding temperature area 8.

The present inventors found that a polyamide material such as a PA12 material has a high coefficient of water absorption of a resin itself, and thus when the powder is not handled at a state retained in a dry environment, a variation of strength itself of a molded body is largely affected by absorbing water in the resin.

Thus, the present inventors found out that a molding can be conducted by using the powder laminate device in the marketplace by employing a copolymerized PBT resin being capable of lowering a melting point. Study results for finding out the present invention are explained as follows.

The resin powder relating to the present invention is a polybutylene terephthalate (hereinafter, referred to as PBT) resin, and can be a polybutylene terephthalate based resin obtained by polycondensing a dicarboxylic acid component comprising terephthalic acid or an ester-forming derivative thereof (such as a lower alcohol ester) with a glycol component comprising 1,4-butanediol or an ester-forming derivative thereof.

Figure 2:
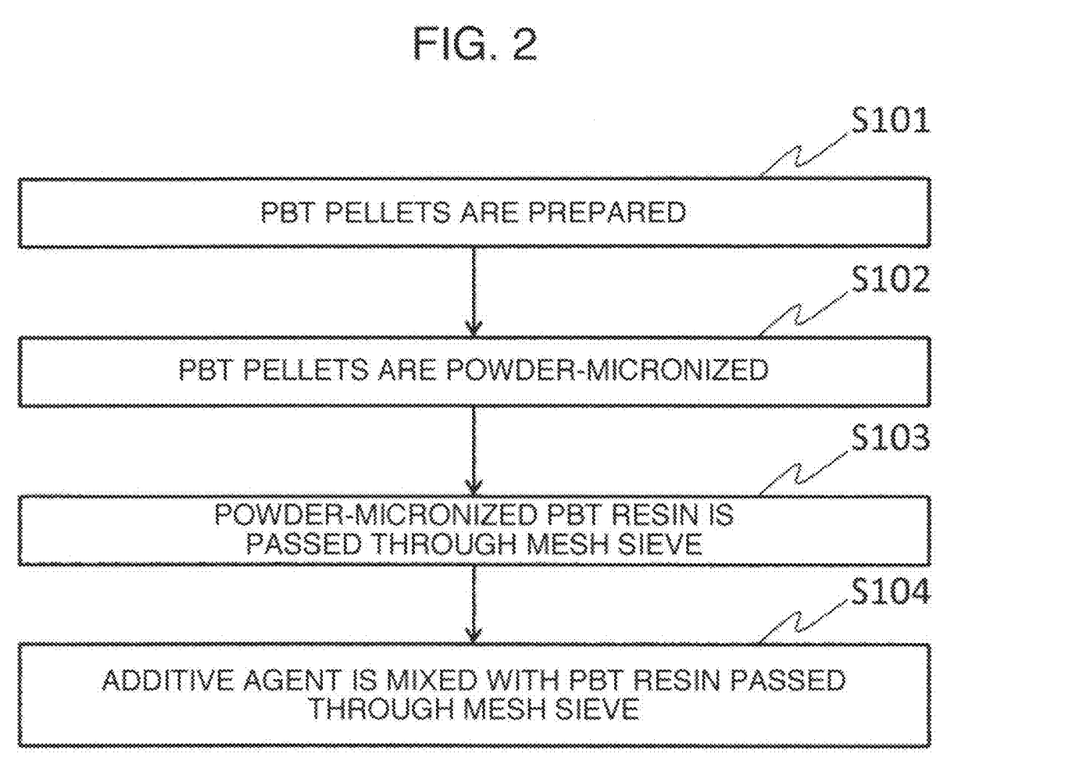
FIG. 2 is a view showing one example of the production method of the resin powder of the present invention.

A production method of the powder resin relating to the present invention is explained below by employing FIG. 2.

First, homo PBT pellets are made ready for (S101). The homo PBT pellets, which are materials prior to working into resin powders, have a melting point of 225° C., a crystallization temperature of 180° C., and an intrinsic viscosity of 0.85 dl/g.

A shape of the pellet may be, for example, a rice grain shape of about 2 mm×1 mm×1 mm or a cylindrical shape of about 2 mm×1 mm (diameter). For micronizing it at the subsequent step, it may not be such shapes, but it is desired to make it as small as possible at this step.

The homo PBT pellets are powder-micronized (S102). This powder-micronizing step was conducted at a state under an outside air temperature of a normal temperature (a range from 0° C. to 35° C.) by a turbo mill manufactured by FREUND-TURBO CORPORATION.

Particularly, when it is not conducted under a normal temperature, there is a tendency to increase a temperature rise of a resin itself at a resin pulverizing step and to deteriorate a yield at the time of powder-micronizing. In the meantime, depending on physical properties of the resin, it is preferably pulverized under a liquid nitrogen. By doing so, a shape of powder is stabilized and further a cost can be remarkably reduced at the time of a large-scale production.

The powder-micronizing method from pellets includes many methods such as a turbo mill, a pin mill, and a hammer mill, but it is preferred to employ a high-speed rotation mill of pulverizing by a shock and a shearing action. In some cases, it is preferred to employ a jet mill. That is, it is sufficient to be able to pulverize so as to form a prescribed particle diameter.

It is preferred also to employ a method of cooling and precipitating, after kneading with the pellets resin by using a solvent etc., and then picking up the powder. In that event, if a solvent is not volatilized once, strength of the molded body cannot be secured, and thus it becomes necessary to conduct a drying step.

In the meantime, in case it cannot be pulverized into a prescribed particle diameter at a time, it may be conducted after a coarse grain once, and the pulverization step may be conducted a few times.

A particle diameter size of the homo PBT powders powder-micronized at S102 was 50% average particle diameter of 83 μm.

Additionally, the micronized resin powders were passed through a mesh sieve of an aperture 106 μm prescribed in JIS Z8801-2000 by an air jet sieve manufactured by ALPINE Corporation (S103).

Figure 3:
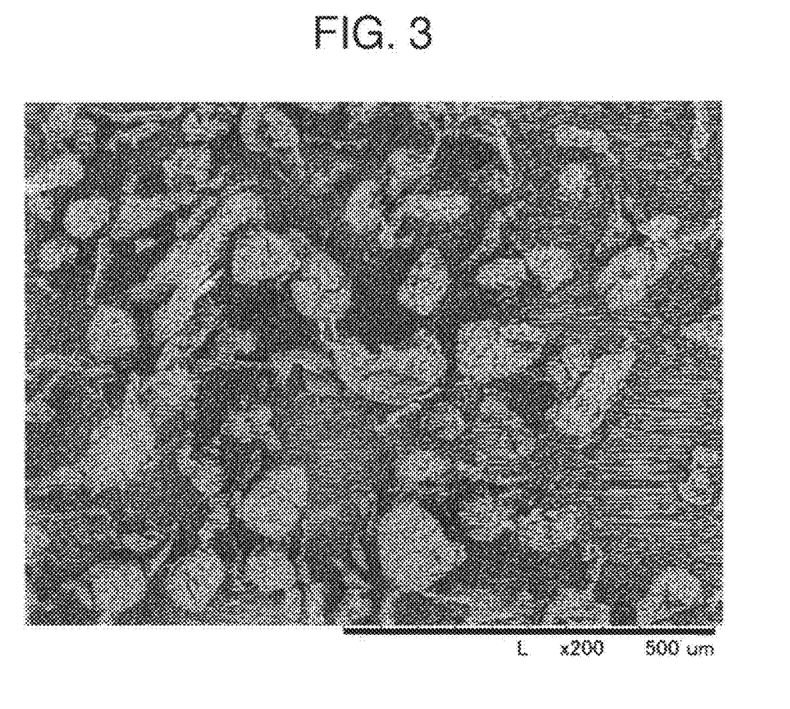
FIG. 3 is one example of a SEM image showing powders prepared by pulverizing homo PBT by a normal temperature pulverizing.

Herein, 100% of a pass product which were passed through the mesh in the micronized powders was employed as a powder resin. An SEM image thereof is shown at FIG. 3. The mesh sieve of 106 μm was used, but it is not limited thereto and it is sufficient to be able to uniform an average particle diameter at a prescribed value or less. For example, the mesh sieve may be of 85 μm.

As another example of the above powder resin material, a case of an isophthalic acid copolymerized PBT (10 mol %) material is explained below.

Isophthalic acid copolymerized PBT pellets, which are materials prior to working into resin powders, have a melting point of 208° C., a crystallization temperature of 153° C., and an intrinsic viscosity of 0.85-1.0 dl/g.

Herein, isophthalic acid copolymerized PBT pellets are made ready for as the first step as well as the above homo PBT (S101).

Next, the isophthalic acid copolymerized PBT pellets are powder-micronized (S102). A particle diameter size of the powder-micronized isophthalic acid copolymerized PBT powders was 50% average particle diameter of 79 μm.

Figure 4:
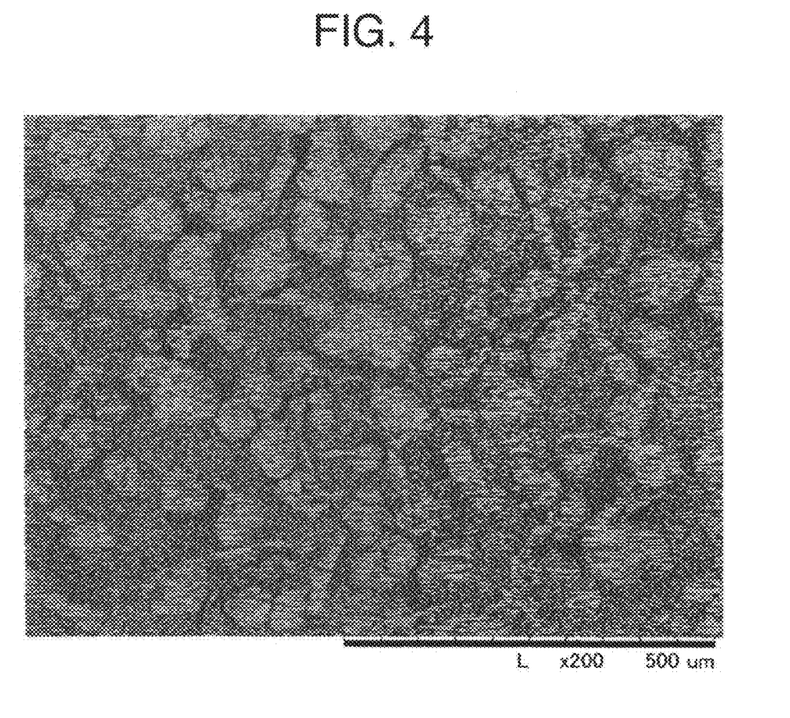
FIG. 4 is one example of a SEM image showing powders prepared by pulverizing isophthalic acid copolymerized PBT by a normal temperature pulverizing.

Additionally, the isophthalic acid copolymerized PBT powders powder-micronized at S102 were subjected to a particle diameter size filtering by a mesh sieve (S103). A SEM image thereof is shown at FIG. 4.

Herein, the homo PBT powders and isophthalic acid copolymerized PBT powder of the resin powders micronized at the step of from S101 to S104 in this way were subjected to differential scanning calorimetry (DSC) to confirm physical properties. As shown at Table 1, it resulted in a rise of a crystallization temperature as compared to a pellet state.

TABLE 1

|  | Pellet | | Powder | |
| --- | --- | --- | --- | --- |
|  | Homo PBT | Isophthalic acid copolymerized PBT | Homo PBT | Isophthalic acid copolymerized PBT |
| Melting point (° C.) | 225 | 208 | 225 | 208 |
| Crystallization temperature (° C.) | 180 | 153 | 195 | 172 |
| ΔT1 (melting point − crystallization temperature) (° C.) | 45 | 55 | 30 | 36 |

Reason for the rise of a crystallization temperature of the powder-micronized powder resin as compared to the pellet state is explained below.

The powder-micronizing of pellets at the S102 step applies a shock and a shearing force to the pellets thus to conduct pulverizing. When the pellets are pulverized, a shock and a shearing force are applied to the pellets, and thus a crystallization temperature is changed.

Next, to the micronized homo PBT powders, a fumed silica having an average primary particle diameter of 12 nm is added in an amount of 0.1 wt % (S104). As another example, it is added in an amount of 1.0 wt %.

Also to the micronized isophthalic acid copolymerized PBT powders, a fumed silica having an average primary particle diameter of 12 nm is similarly added in an amount of 0.1 wt % or 1.0 wt %. Herein, the fumed silica may be added prior to the powder-micronizing S102.

However, it is desired to add it after the powder-micronizing, because a particle diameter of fumed silica is smaller than that of the powder-micronized powder resin.

(Lamination Molding Employing a Lamination Molding Device Etc.)

Lamination molding was conducted by employing the PBT resin powder material comprising the above-mentioned fumed silica added.

RAPHAEL 300 manufactured by Aspect, Inc. was used as a three-dimensional lamination molding device, and a lamination molding was conducted by employing the above-mentioned lamination molding method.

By employing four fumed silica-added PBT resin powder materials described at Table 2 explained above, tensile test specimens (corresponding to ISO 527-1, 2; a preparation of 24 pieces per one molding) and bending test pieces (corresponding to ISO 178; a preparation of 6 pieces per one molding) were prepared. The molded bodies prepared were subjected to a strength evaluation. Molding capability and strength evaluation results are shown at Table 2. In the meantime, detailed lamination molding conditions are also shown at Table 2.

TABLE 2

|  |  | Homo PBT | Homo PBT | Isophthalic acid copolymerized PBT | Isophthalic acid copolymerized PBT | Isophthalic acid copolymerized PBT |
| --- | --- | --- | --- | --- | --- | --- |
| Powder properties | Amount of fumed silica added (wt %) | 0 | 0.1 | 0 | 0.1 | 0.1 |
|  | Angle of repose (°) | 49.1 | 41.8 | 49.5 | 37.9 | 41.2 |
|  | Degree of compaction (°) | 39.6 | 27.7 | 36.6 | 22.7 | 27.9 |
|  | Hausner ratio | 1.66 | 1.38 | 1.58 | 1.29 | 1.39 |
| Molding conditions | Laser power (W) | 15-35 | 15-35 | 15-35 | 15-35 | 15-35 |
|  | Scan speed (m/s) | 5.0 | 5.0 | 5.0 | 5.0 | 5.0 |
|  | Scan pitch (mm) | 0.15 | 0.15 | 0.15 | 0.15 | 0.15 |
|  | Lamination thickness (mm) | 0.10 | 0.10 | 0.10 | 0.10 | 0.10 |
|  | Molding area retention temperature (° C.) | 205 | 205 | 190 | 190 | 190 |
| Molding evaluation | Molding capability | no | no | yes | yes | no |
|  | Tensile strength maximum value (MPa) | — | — | 48.4 | 51.4 | — |
|  | Flexural strength maximum value (MPa) | — | — | 68.6 | 71.6 | — |

The laser power was every 2.5 W parameter from 15 W to 35 W. The tensile and flexural strength showed values at the conditions (25 W) which show a maximum at an average value under each condition n=5.

Additionally, Table 2 also shows evaluation results of flow properties (an angle of repose, a degree of compaction, and a Hausner ratio) of the powders in the presence or absence of fumed silica added, by employing a powder tester manufactured by Hosokawa Micron Corp.

Figure 1:
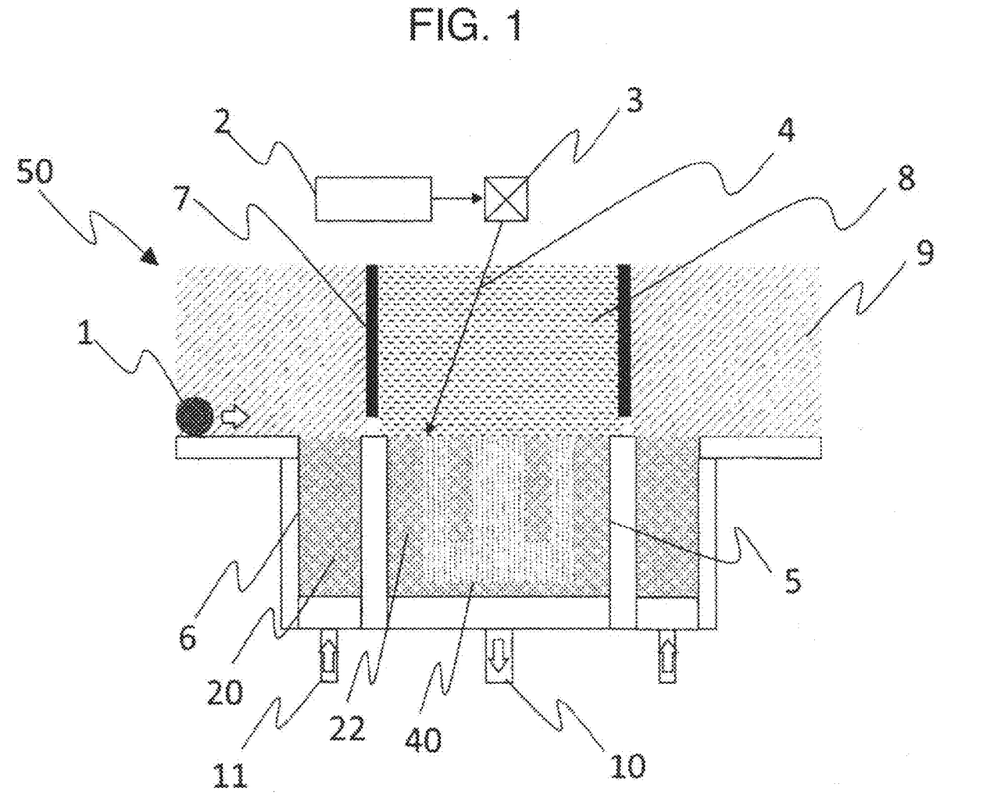
FIG. 1 is a plan view showing a configuration of a laser powder laminate molding device.

When the above lamination molding is conducted at a state retaining 205° C. of a storage temperature area 8 of a molding chamber, which the laser powder laminate molding device 50 shown at FIG. 1 has, by employing materials of homo PBT resin powders or homo PBT resin powders comprising the fumed silica added in amount of 0.1%, a warpage of 0.1 mm or more of the molded body 40 is formed in the laser irradiation, and when the roller 1 arranges a next layer of a powder resin, a warpage comes to be generated and it comes to be contacted with the molded body having the warpage. It was found that, when the roller 1 is contacted with a molded body having a large warpage, the molded body moves or the powder resin cannot be smoothly arranged, and thus it cannot be normally molded.

On the contrary, when fumed silica in an amount of 0.1% was added to the isophthalic acid copolymerized PBT resin powder or isophthalic acid copolymerized PBT resin powder and a molding was conducted at a state of a molding storage temperature area 8 at 190° C., a generation of a warpage was not confirmed and it was confirmed that molded bodies of plural test specimens can be molded at a time. Meanwhile, a molding was able to be conducted even in case a period of time per one layer became 10 minutes.

Additionally, it was revealed that, in case fumed silica was added in an amount of 1.0%, flow properties were improved as compared to the case of not adding, but a warpage was generated in a molded body in the laser irradiation and a molding was not able to be conducted as well as the case of employing homo PBT. In the meantime, as to tensile and flexural strengths, it was found out that a molded body having a tensile strength of 51.4 MPa and a flexural strength of 71.6 MPa can be prepared by employing powders comprising fumed silica added in an amount of 0.1 wt %.

In this way, it comes to be able to provide a molded body of a PBT resin having a high quality based on a PBT resin having a melting point of 200° C. or more by conducting a lamination molding by employing the resin powder of the present invention.

In the meantime, a tensile strength of the molded body employing PA12 is 45 MPa and a flexural strength thereof is 60 MPa, and thus it is understood that the PBT resin molded body of the present invention has a higher strength.

In the present study, it was found that, even in case of using an isophthalic acid copolymerized PBT powder as a simple substance, a molding itself can be conducted to achieve a strength close to that of the case of adding fumed silica in an amount of 0.1 wt %, but a partial crack was generated on a molding face in some cases.

Additionally, there is a merit that a small $\Delta T1$ can be achieved by using isophthalic acid copolymerized PBT as the powder resin, and thus a robustness to a molding temperature can be enhanced and a crystallization temperature can be also lowered as compared to homo PBT, and thus a warpage can be lowered at the time of returning to a room temperature. Moreover, a residual stress can be also lowered.

In the laser lamination molding, a laser light is irradiated on resin powders and the powders are sintered and fused each other to laminate them, and a melt control of the resin at the laser irradiation is generally conducted by a laser energy.

Particularly, when a melting temperature of the resin becomes too high, an air bubble is likely to be generated due to a thermal decomposition of the resin, and in result, it is remained as a void within a molded body and strength or reliability come to be lowered. Thus, when a difference $\Delta T2$ between a melting point and a thermal decomposition temperature of the resin powder is larger, a robustness is higher.

Table 3 shows melting point and thermal decomposition temperature (a temperature at which a weight is lowered by 1%) of the homo PBT and isophthalic acid copolymerized PBT powders. Even isophthalic acid copolymerized PBT lowering a melting point has a thermal decomposition temperature as same level as that of homo PBT.

TABLE 3

| — | Homo PBT | Isophthalic acid copolymerized PBT |
|---|---|---|
| Melting point (° C.) | 225 | 208 |
| Thermal decomposition temperature (° C.) | 301 | 301 |
| $\Delta T2$ (thermal decomposition temperature – melting point) (° C.) | 76 | 93 |

Therefore, it was newly found that also a robustness to voids can be enhanced by using isophthalic acid copolymerized PBT.

In the meantime, the PBT resin relating to the present invention is a copolymerized PBT resin and includes a material prepared by copolymerizing terephthalic acid and 1,4-butanediol and other dicarboxylic acid copolymerizable therewith (or its ester-forming derivative) or other diol (or its ester-forming derivative). The above other dicarboxylic acid usable includes isophthalic acid, phthalic acid, 4,4'-diphenyl ether dicarboxylic acid, 5-sodium sulfoisophthalic acid, 2,6-naphthalene carboxylic acid, azelaic acid, adipic acid, sebacic acid, 1,3-cyclohexane dicarboxylic acid, 1,4-cyclohexane dicarboxylic acid, and dimer acid etc. The above other diol usable includes diethylene glycol, polyethylene glycol, polypropylene glycol, and polytetramethylene glycol etc.

When a ratio of a copolymerizable monomer is too high as a copolymer component, a heat-resistance comes to be remarkably lowered. Thus, from 3 to 30 mol % is desired. Particularly, in case of an isophthalic acid copolymerization, it is suitably from 5 to 15 mol %. By considering these copolymerization ratios, a melting point of PBT is preferably lowered by from 10 to 25° C. to be from 200 to 215° C.

An intrinsic viscosity of the copolymerized PBT resin is desirably from 0.5 to 1.5 dl/g. When it is smaller than it, a mechanical strength of the resin molded body 40 is lowed. When it is larger than it, a non-sintered portion is likely to be generated at the time of the laser irradiation and a mechanical strength of the resin molded body 40 is lowed.

By adopting these values, a molding can be conducted by using a commercially available equipment due to a reasonable melting point lowering, and a molded body having a high quality can be obtained. Additionally, a warpage and a void can be also lowered at the time of conducting a lamination molding, and a molded body having also a high precision and reliability can be obtained.

Although the above working examples use about 80 μm of 50% average particle diameter of the resin powder, it may be a range of from 10 to 100 μm. In case the average particle diameter of the resin powder is less than 10 μm, when a temperature of the molding area 8 is a high temperature close to a molding temperature, the resin powders are agglomerated with each other, and it becomes difficult to set it by a roller 1 or blade 1, and if it is large, a void is likely to be generated at the time of the laser irradiation.

However, even in that event, it is desired to use 100% of resin powders which passed through a mesh sieve having an aperture of at least about 106 μm.

Additionally, if desired, a 50% average particle diameter of the powders is preferably from 30 to 80 μm. At this range, it is difficult to generate a remarkable lowering of arranging properties due to the agglomeration, and a molding having a high quality becomes possible.

An arrangement of the powders by the roller 1 or blade 1 largely affects a density at the time of molding the resin or a molding capability, and thus it is desired to satisfy either an angle of repose 50° or less, a degree of compaction 40° or less, or a Hausner ratio 1.60 or less.

However, considering a roughness of the molded body 40 or a molding yield, it is more desired to be an angle of repose 40° or less, a degree of compaction 25° or less, and a Hausner ratio 1.34 or less. In order to satisfy this value, it is preferred to add fumed silica etc. in an amount of 0.01% or more but less than 1.0% to the resin powder 20, desirably 0.1% or more but 0.5% or less. When it is a small amount, a flow property is not so improved. When it is a large amount, the lubricant itself is agglomerated, a flow property is not improved, moreover it acts as a nuclear material at the time of a laser irradiation, a warpage is generated, and even a molding becomes impossible.

In the meantime, the lubricating substance to be added to the PBT resin for improving a flow property may be not only fumed silica but also an inorganic substance such as alumina. It is desired to use one having a primary particle diameter average of 50 nm or less.

Additionally, it is desired that the lubricant is at a state of being mixed with the PBT resin micronized by a mixer etc. at a state of being agglomerated at a 50% average particle diameter of at least 100 μm or less.

Considering the a particle diameter of the PBT resin powders mixed with this lubricant, a lamination thickness of the resin powders to be subjected to a molding is preferably from 0.05 mm to 0.15 mm.

In the meantime, depending on a temperature of the pulverizing step of powder-micronizing, for example, in case the pulverizing is conducted at a state of retaining a low temperature state by liquid nitrogen etc., an elongation due to a plastic deformation of the powders is small as compared to the case of pulverizing at a normal temperature, a relatively uniform distribution of a particle diameter is obtained, and a flow property is good in many cases.

In that event, it is not necessarily needed to add a lubricant or lubricating substance such as the above alumina, and it is sufficient to satisfy the above powder properties.

The PBT resin relating to the present invention may form an alloy with a resin comprising an ester such as polyethylene terephthalate (PET) or polycarbonate (PC).

The formation of the alloy with a resin comprising an ester has a merit of being capable to lower a crystallization temperature by an ester exchange. Particularly, an alloy with PC comprises a non-crystalline PC, and thus it can remarkably suppress a warpage at cooling after molding.

In the above, an alloy proportion of PET or PC is desirably from 5 to 40%. In case of preparing an alloyed powder-micronized resin material, alloyed pellets may be powder-micronized by various pulverizing methods to obtain the above resin powder properties.

However, when an ester exchange excessively occurs, a molecular weight may be also lowered, and in result, mechanical physical properties may be lowered.

In this case, since mechanical properties are lowered, it is also effective to add an additive agent such as a phosphorus based compound, for example, a phosphite compound and a phosphate based stabilizer so as not to proceed to an excessive ester exchange. A phosphorus based stabilizer may be in an amount of from 0.003 to 0.03 part by weight relative to the alloy resin.

The PBT resin relating to the present invention may comprise a thermoplastic elastomer. The thermoplastic elastomer may be preferably styrene based, olefin based, and polyester based, and may be used together with the above alloy. In this case, it can enhance shock strength of the resin molded body.

To the PBT resin powder, various additive agents, for example, an antioxidant, an ultraviolet absorber, a heat stabilizer, a mold release agent, an antistatic agent, a coloring agent such as a dye and a pigment, a dispersing agent, and a plasticizer etc. can be added. In case the above additive agent is contained, it is desirably added at a preparation stage of the pellets then to pulverize, but in many cases the additive agent comes to elevate a crystallization temperature.

In that event, a crystallization temperature may be controlled by rising a copolymerization proportion or alloying as shown above. As a basis, 1 wt % or less is desired relative to a PBT resin material amount. Therefore, even in case of adding the above additive, it can be conducted by alloying.

In case flame retardance requires for example V0 of UL-94, it is necessary to contain relatively many flame retardant as compared to other additive agents.

Particularly, from the viewpoint of halogen-free, it is preferred to employ a phosphoric acid ester based and a hydrated metal compound (such as magnesium and aluminium hydroxide). However, in case of no prescription on halogen-free, from the viewpoint of a cost and heat stability and molding quality, it is preferred to add a flame retardant promoter such as antimony to a bromine based flame retardant.

As the bromine based flame retardant, brominated polystyrene and brominated phenoxy and brominated epoxy etc. are effective. Particularly, a use of brominated epoxy having a relatively high decomposition temperature is more effective to be able to recycle the resin powders.

In the meantime, in order to satisfy V0, from 20 to 40 wt % as a total of these flame retardant and flame retardant promoter is necessary relative to a PBT resin material amount.

In that case, as well as other additive agents, it becomes necessary to control a crystallization temperature. Thus, considering many flame retardant amount, it is desired to knead a flame retardant at a state of pellets and then pulverize, rather than to blend a flame retardant powder with said PBT resin powder.

In the meantime, the PBT resin powder of the present invention has a relatively small degree of crystallinity, and thus a transmittance of the powder may be high depending on a material type or a lamination thickness. In that event, as to a portion in which there is a powder under a laser irradiation face, also the underlying powder may be sintered or molten.

Therefore, it may be effective to add the above additive agent in also a sense of adjusting a transmittance. A laser irradiation energy may be small at only a place, in which there is a powder under a laser irradiation face, as compared to a place in which powders are set on a molded body, to not add an additive agent.

In the meantime, the PBT resin powder may be a combination of homo PBT with copolymerized PBT at a powder state. At least one powder may be alloyed with PET or PC.

In this instance, preferably, rather than mixing respective resin powders at a state of micronized resin powder, it may be heat-molten and kneaded at a mixing state and pelletized and then powder-micronized, because a compatibility of respective resin materials each other is enhanced.

In order to enhance a rigidity and lower a degree of shrinkage of the PBT resin of the resin powder, it is preferred to add an inorganic filler in an amount of from 5 to 40 wt %.

In that event, a short fiber material having a maximum size 300 μm or less is preferably blended. When it is more than the value, not only a roughness is increased but also a deterioration on a precision of an end portion comes to draw an attention.

As for a shape, a spherical material may be employed. 50% average particle diameter of 100 μm or less is desired. Such a particle diameter is difficult to generate an agglomeration with the micronized PBT resin and can suppress a generation of a void at the time of irradiating a laser light.

In case of both, considering a recyclability of a resin powder and a precision of the molded body lamination molded, it is necessary to pass 100% through a mesh sieve of an aperture of about 106 μm.

In this instance, at least 99% or more of an inorganic filler is necessary to have a maximum size of 10 μm or more. Reasons therefor are because, as well as the case of adding other additive agents, when an inorganic filler of less than 10 μm is contained in an amount of 1% or more, it acts as a nuclear material to generate a warpage at the time of molding.

The inorganic filler to be used can include glass fiber, glass flake, glass beads, carbon fiber, mica, talc, calcium carbonate, magnesium hydroxide, boehmite, zinc oxide etc. solely or in plural thereof. Fiber represents one having a fiber shape and a cylindrical shape or rectangular parallelepiped. Flake represents an oblate shape having a thickness. Beads represent substantially spherical and a concept comprising a substantially elliptoid spherical body.

Two kinds or more of these inorganic fillers can be used together with. These inorganic fillers can be used after preliminarily treated with a coupling agent such as an organosilane based compound, an epoxy compound, an isocyanate based compound, an organic titanate based compound, and an organic borane based compound.

However, a laser light-irradiated portion of the resin powder 21 set has a possibility to become at least 300° C. or more, and thus it is necessary to employ a coupling agent material having a high heat-resistance.

In the meantime, in case an inorganic filler is used together, an adhesiveness between a PBT resin component and an inorganic filler may become a problem. In that event, in order to improve the adhesiveness, not only an improvement of a material face such as a surface modification of an inorganic material but also plural times irradiation by changing a laser irradiation energy per one laminate portion are effective means.

For example, in case silane treated glass fiber having a standard fiber diameter of 11 μm and having an average fiber length of 100 μm is contained in an amount of 30% in the powders in which 0.1% fumed silica is added to the isophthalic acid copolymerized PBT resin shown at Table 1, the results of once irradiation and twice irradiation are shown below.

Once irradiation has conditions similar to those shown at Table 2. In case of twice irradiation, energy was changed, i.e. 20 W in the first irradiation and 25 W in the second irradiation. The results are shown at Table 4. In case of once irradiation, a strength was somewhat lowered by adding glass fiber, whereas in case of twice irradiation, it was confirmed that a strength was remarkably enhanced.

TABLE 4

| | | | — | Isophthalic acid copolymerized PBT | Isophthalic acid copolymerized PBT |
|---|---|---|---|---|---|
| | Amount of fumed silica added (%) | | | 0.1 | 0.1 |
| | Amount of glass fiber added (%) | | | 30 | 30 |
| Molding conditions | First irradiation | Laser power (W) | | 15-35 | 20 |
| | | Scan speed (m/s) | | 5.0 | 5.0 |
| | | Scan pitch (mm) | | 0.15 | 0.15 |
| | Second irradiation | Laser power (W) | | — | 25 |
| | | Scan speed (m/s) | | — | 5.0 |
| | | Scan pitch (mm) | | — | 0.15 |
| | Lamination thickness (mm) | | | 0.10 | 0.10 |
| | Molding area retention temperature (° C.) | | | 190 | 190 |
| Molding evaluation | Tensile strength maximum value (MPa) | | | 50.5 | 60.9 |
| | Flexural strength maximum value (MPa) | | | 68.5 | 84.4 |

(Re: Lamination Molding Method)

Figure 5:
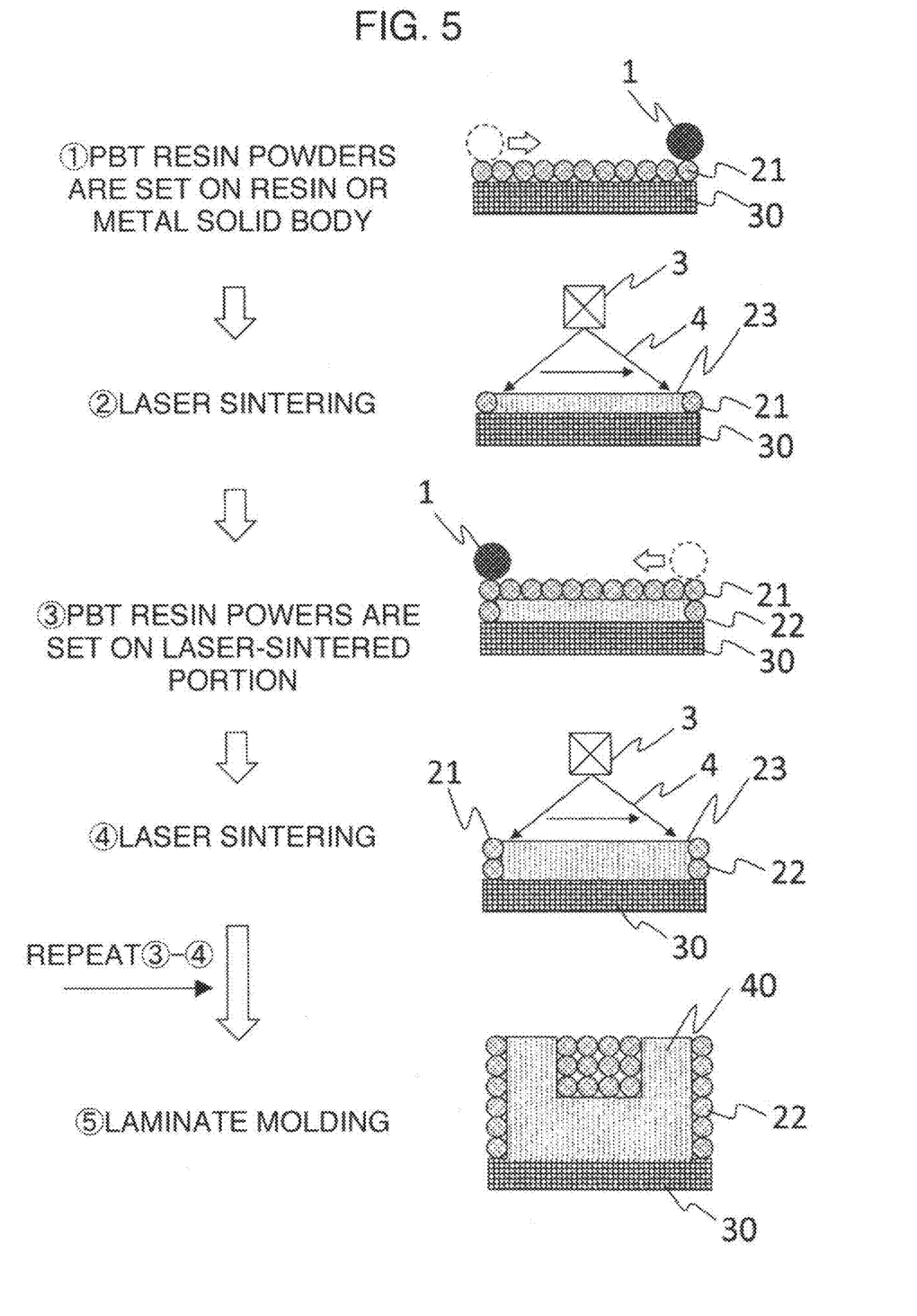
FIG. 5 is a plan view showing another working example of the laser powder laminate molding method of the present invention.

A method of conducting a powder laminate molding to other member 30 such as a metal and a molded article of same or different kind material of the copolymerized PBT resin by employing the copolymerized PBT resin of the present invention is explained by using FIG. 5.

In the present examples, a device configuration employs the laser powder laminate molding device 50 described at FIG. 1. Explanations of configuration within the device with no explanations are similarly omitted. As mentioned at the above Example 1, powders themselves can configure a molded body 40, but a molding may be partially conducted and parts having a complicated functionality may be configured depending on a product. Such a case is explained.

The PBT resin of the present invention can be molded onto other member 30. Herein, in order to verify the superiority of the present invention, at first the inventors studied to mold a bending test piece on an injection molded PBT base (containing 30% glass fiber) by employing usual homo PBT. A retention temperature of molding storage temperature area 8 was set to 205° C. In result, during the retention at 205° C., 4 mm thick bending test piece (corresponding to ISO178) itself was able to be molded, but a release was generated between the PBT base and the bending test piece at the time of slow cooling after a completion of molding.

Additionally, the case of a temperature of a molding storage temperature of 100° C. was tried, but a release was generated between the PBT base and it at the time of molding. On the contrary, in case of employing isophthalic acid copolymerized PBT, it was confirmed that a molding was possible at a state in which a retention temperature of the molding storage temperature area 8 was 190° C. and 100° C. Therefore, when the copolymerized PBT of the present invention is employed, a lowering of a crystallization temperature can lower a stress during molding and at the time of cooling, and a lamination molding on a same kind of material comes to be possible.

Additionally, also as for other member 30 such as a different resin and metal, a boundary face strength can be enhanced to be molded by beforehand subjecting it to a surface treatment.

Specifically, in case of molding on other member (solid body) configured by a resin, it is desired to subject the boundary face of other member configured by a resin to a plasma treatment, UV ozone treatment, or an excimer laser treatment. In addition thereto, it is effective also to impart a reasonable roughness (Ra: from 1.0 to 7.0 μm) to a metal.

Additionally, in order to improve adhesiveness between the PBT resin powder and other member 30 such as a metal and a molded article of same or different kind material thereof, it is also an effective means to conduct a laser irradiation on only the layer plural times.

In case of molding at a state of a temperature lower than a crystallization temperature of the PBT resin powder, there is a merit to enhance a recyclability of the resin powders 20 and 22 and additionally to increase choices of relatively unstable material to heat. Moreover, adhesiveness between the resin molded body 40 and the powder 22 is low, and thus there is a merit to be able to remarkably lower a release workload of the powder 22 from the resin molded body 40.

By contrast, there is a demerit that the resin powder 21 itself is likely to be thermally decomposed at the time of a laser irradiation due to a low temperature of the molding storage temperature area 8. Even in this instance, it becomes an effective means to employ the copolymerized PBT, because a difference ΔT2 between the thermal decomposition temperature and the melting point can be broadened. Additionally, in this case, it is also a very effective method to change a laser irradiation energy and to use plural times irradiations together.

In the meantime, in case of conducting a powder laminate molding to other member 30 such as a metal and a molded article of same or different kind material, other member 30 itself for molding becomes a member similar to a support member 24, and thus many materials becoming a nuclear material may be comprised depending on a structure.

In the meantime, in case of molding at a state of a molding storage area 8 temperature lower than a crystallization temperature of the PBT resin powder, it is desired that other member 30 configured by a resin has a high rigidity as compared to that of PBT resin to be molded. When a rigidity is low, a warpage comes to be formed in resinous other member 30 due to a shrinkage force of the resin molded body 40, and even a molding comes to not be possible.

Figure 6:
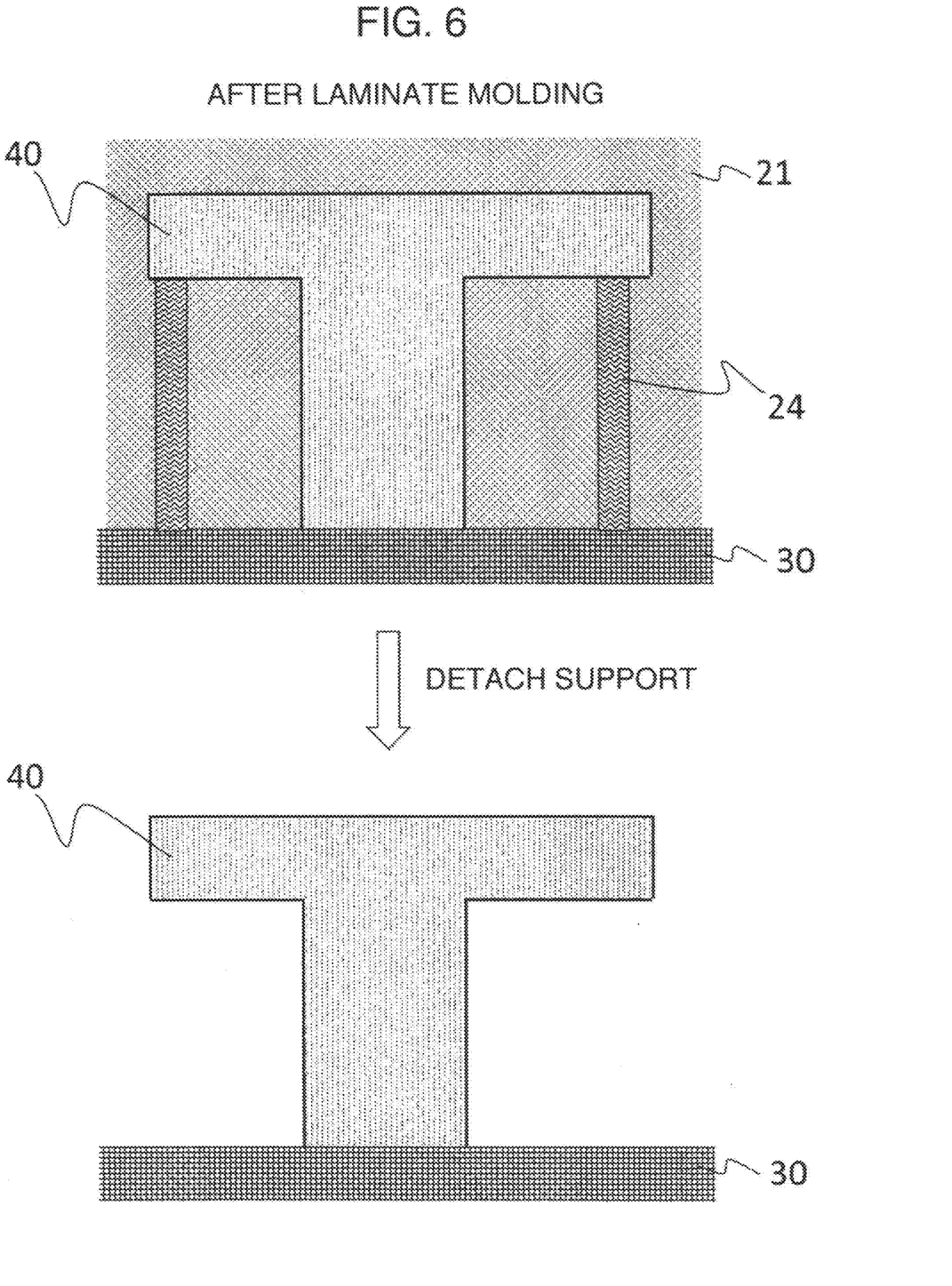
FIG. 6 is a plan view showing another working example of the laser powder laminate molding method of the present invention.

Additionally, in case of conducting a powder laminate molding to other member 30 such as a metal and a molded article of same or different kind material, in order to form a free shape, an extreme overhang portion may be necessary. In that event, as shown at FIG. 6, a support member 24 can be formed by the PBT resin powder once, and it can be finally detached. Additionally, it is desired that the support member 24 is likely to be afterward detached and has a low density as compared to the molded body e.g. by making a laser energy smaller.

In the meantime, in the present invention, the case of directly molding on a resinous or metallic other member 30 is described, but from the viewpoint of an enhancement of recyclability or a use of a relatively unstable material to heat, a molded body can be directly molded at a crystallization temperature of PBT resin or less.

In this case, it can be understood that the resin or metallic other member is a substrate for the support member 24. In that event, it is necessary to finally peel the resin molded body 40 and the substrate of the support member 24. Also in this instance, it is also a very effective method to change a laser irradiation energy and to use plural times irradiations together.

Embodiments of Examples are split to be explained as above. These are not irrelevant to each other, and one is relevant to a change example of partial or whole of another. In the meantime, a laser powder laminate molding method is explained as a target as mentioned above, but the present invention can also apply to a method of melting/sintering and molding a resin powder by a heat other than a laser.

For example, a specific absorber can be mixed with a powder resin, and the resin can be selectively heated by a light such as an absorbing infrared radiation. A material absorbing a light can be selectively discharged to a powder by an ink-jet etc., and an infrared radiation lamp etc. can be physically moved as well as a roller 1 to selectively heat it. Additionally, it is effective to also a lamination molding method of discharging a molten resin from a nozzle to laminate it.

REFERENCE SIGNS LIST

1 . . . roller or blade
2 . . . laser light source
3 . . . galvanometer mirror
4 . . . laser light
5 . . . molding container
6 . . . powder storage container
7 . . . reflecting plate
8 . . . molding temperature area
9 . . . storage temperature area
10 . . . piston
11 . . . piston
20 . . . resin powder for supply
21 . . . resin powder (resin powder set by roller or blade)
22 . . . resin powder (resin powder buried within a molding container 5)
23 . . . laser-sintered portion
24 . . . support member
30 . . . other member
40 . . . resin molded body
50 . . . laser powder laminate molding device

The invention claimed is:

1. A resin powder material comprising:
a polybutylene terephthalate resin powder having a crystallization temperature lower than that of a homopolybutylene terephthalate resin powder, wherein said polybutylene terephthalate resin powder is a copolymer comprising an isophthalic acid component in an amount of from 5 mol % to 15 mol % of said polybutylene terephthalate resin powder, and a first inorganic substance comprising a fumed silica having an average primary particle diameter of 100 nm or less in an amount of 0.05 or more but less than 1.0 wt % of said polybutylene terephthalate resin powder,
wherein the polybutylene terephthalate resin powder has an average particle diameter of 79 µm and a maximum particle diameter of 106 µm or less,
wherein the homopolybutylene terephthalate resin powder has an average particle diameter of 83 µm and a maximum particle diameter of 106 µm or less,
wherein the polybutylene terephthalate resin powder is formed from a plurality of pellets having a viscosity of 0.85 to 1.0 dl/g, and
wherein a difference between a melting point temperature of the polybutylene terephthalate resin powder and the crystallization temperature of the polybutylene terephthalate resin powder is about 19° C. lower than a difference between a melting point temperature of the polybutylene terephthalate resin pellets and the crystallization temperature of the polybutylene terephthalate resin pellets, and
wherein said resin powder material is used for powder laminate molding.

2. The resin powder material according to claim 1, wherein said polybutylene terephthalate resin is in the form of an alloy with a polyethylene terephthalate resin or a polycarbonate resin, and an alloy ratio of said polybutylene terephthalate resin to said polyethylene terephthalate resin or said polycarbonate resin is from 5 wt % to 40 wt %.

3. The resin powder material according to claim 1, wherein the resin powder material comprises a flame retardant mixed with said polybutylene terephthalate resin.

4. The resin powder material according to claim 1, wherein the resin powder material comprises a second inorganic substance selected from the group consisting of glass fiber, glass flake, carbon fiber, mica, talc, calcium carbonate, magnesium hydroxide, boehmite, and zinc oxide, and having a major axis direction size of 300 μm or less in an amount of from 5 to 40 wt % mixed with said polybutylene terephthalate resin.

5. The resin powder material according to claim 1, wherein the resin powder material comprises a second inorganic substance being an inorganic filler comprised of a plurality of glass beads having an average primary particle diameter and 50% average particle diameter of 100 μm or less in an amount of at least from 5 to 40 wt % mixed with said polybutylene terephthalate resin.

6. The resin powder material according to claim 1, wherein said polybutylene terephthalate resin has a Hausner ratio of 1.34 or less at room temperature.

7. The resin powder material according to claim 1, wherein said polybutylene terephthalate resin has an angle of repose of 40 or less at room temperature.

8. The resin powder material according to claim 1, wherein the crystallization temperature is measured using differential scanning calorimetry (DSC).

* * * * *